(12) United States Patent
Ahuja et al.

(10) Patent No.: US 8,248,943 B2
(45) Date of Patent: Aug. 21, 2012

(54) METHOD AND APPARATUS FOR ENSURING ACCESS IN A COMMUNICATION SYSTEM FOR A PLURALITY OF GROUPS

(75) Inventors: Ramandeep Ahuja, Chicago, IL (US);
James A. Marocchi, Winfield, IL (US);
Trent J. Miller, West Chicago, IL (US);
Deborah J. Monks, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 337 days.

(21) Appl. No.: 12/643,085

(22) Filed: Dec. 21, 2009

(65) Prior Publication Data

US 2011/0149875 A1 Jun. 23, 2011

(51) Int. Cl.
*G01R 31/08* (2006.01)
(52) U.S. Cl. .......................................... 370/235; 370/437
(58) Field of Classification Search .................. 370/230, 370/235, 437
See application file for complete search history.

(56) References Cited

U.S. PATENT DOCUMENTS

| | | | |
|---|---|---|---|
| 5,778,320 A | 7/1998 | Drozt | |
| 7,068,607 B2 | 6/2006 | Partain | |
| 7,092,356 B2 | 8/2006 | Rabie | |
| 2003/0043741 A1* | 3/2003 | Mukai et al. | 370/229 |
| 2005/0243759 A1* | 11/2005 | Torarp et al. | 370/328 |
| 2006/0072453 A1 | 4/2006 | Olariu et al. | |
| 2008/0221951 A1 | 9/2008 | Stanforth | |
| 2008/0222019 A1 | 9/2008 | Stanforth | |
| 2008/0222020 A1 | 9/2008 | Stanforth | |
| 2008/0222021 A1 | 9/2008 | Stanforth | |
| 2008/0240034 A1 | 10/2008 | Gollamudi | |
| 2009/0154351 A1 | 6/2009 | Kim | |
| 2009/0154413 A1 | 6/2009 | Kim et al. | |
| 2009/0157880 A1 | 6/2009 | Lee et al. | |
| 2009/0161540 A1 | 6/2009 | Zaki et al. | |
| 2009/0325585 A1* | 12/2009 | Farajidana et al. | 455/450 |
| 2010/0195583 A1* | 8/2010 | Nory et al. | 370/329 |
| 2010/0240384 A1 | 9/2010 | Nobukiyo et al. | |

FOREIGN PATENT DOCUMENTS

| | | |
|---|---|---|
| EP | 1443790 A1 | 8/2004 |
| EP | 1729532 A1 | 12/2006 |
| EP | 2026514 A1 | 2/2009 |
| WO | 0127644 A1 | 4/2001 |
| WO | 2004030393 A1 | 4/2004 |

(Continued)

OTHER PUBLICATIONS

Salami, G. et al., "Non pool based spectrum sharing for two UMTS operators in the UMTS Extension band," PIMRC 2008, Sep. 15, 2008.

(Continued)

*Primary Examiner* — Phuc Tran
(74) *Attorney, Agent, or Firm* — Barbara R. Doutre

(57) ABSTRACT

A method and apparatus for bandwidth brokering in a communication system (100) defines groups (212) and a bandwidth allocation for each group at a given base station (202). Each group has a guaranteed bandwidth (116). Each group may exceed its guaranteed bandwidth (118) by using additional bandwidth if there other groups are not using their full guaranteed bandwidth (408) or if there is community bandwidth available. A group's bandwidth usage may be preempted (412) when its bandwidth usage exceeds its guaranteed bandwidth and other groups require additional bandwidth within their guaranteed bandwidth.

17 Claims, 3 Drawing Sheets

FOREIGN PATENT DOCUMENTS

WO  2009141016 A1  11/2009

OTHER PUBLICATIONS

Garcia, L. et al., "Comparison of Spectrum Sharing Techniques for IMT-A Systems in Local Area Networks," IEEE, 2009.

International Search Report and Written Opinion for International Application No. PCT/US2010/058627 mailed on Feb. 18, 2011.

Lao, L. et al., "Reducing Multicast Traffic Load for Cellular Networks using Ad Hoc Networks," Proceedings of the 2nd International Conference on Quality of Service in Heterogeneous Wired/Wireless Networks (Qshine' 05), IEEE, Aug. 22, 2005, pp. 10.

Notice of Allowance mailed Dec. 28, 2011, in U.S. Appl. No. 12/648,476, Anatoly Agulnik, filed Dec. 29, 2009.

Polk, et al., "A Resource Reservation Protocol (RSVP) Extension for the Reduction of Bandwidth of a Reservation Flow," RFC 4495, May 2006.

Nichols et al., "A Two-Bit Differentiated Services Architecture for the Internet," RFC2638, Jul. 1999.

International Search Report and Written Opinion for International Application No. PCT/US2010/059392 mailed on Mar. 4, 2011.

Motorola, "ARP Value Range," 3 GPP TSG SA WG2 Meeting #67, Sophia Antipolis, France, vol. SA WG2, Aug. 25-29, 2008, 2 pages.

* cited by examiner

METHOD AND APPARATUS FOR ENSURING ACCESS IN A COMMUNICATION SYSTEM FOR A PLURALITY OF GROUPS

FIELD OF THE DISCLOSURE

The present disclosure relates generally to wireless communication mobile networks and more particularly to communication service access control to ensure subscriber groups affiliated with the communication system will have at least a minimum level of access.

BACKGROUND

Mobile communication systems are in widespread use, and continue to play an increasing role in facilitating information and communication access over large geographic regions. Communication systems are typically shared by many users or subscribers. In certain communication systems, users are organized in groups. For example, in a public safety communication system, a municipality may have police, fire, and emergency medical groups. In other systems there may be groups formed for various business entities, trucking fleets, taxis, and so on.

It is common for the number of subscribers or affiliated parties of a communication system to far outnumber the capacity of the communication system. Communication system operators allow this because at any given time only a fraction of the number of communicators supported by the communication system will actually be engaged in a communication activity through the system. However, occasionally there are periods when a greater number of users than usual will request communication service. It is not uncommon for a particular cell of a communication system to reach capacity at peak times or during events which result in an unusual number of users attempting to communicate. In systems such as those operated for public safety, it is important to maintain some level of access for the various groups supported by the communication system. A simple solution is to limit the amount of system resources a particular group can access. However, such a hard limit may not be optimum when the limited group is experiencing a high amount of communication traffic, and other groups supported by the system are not.

Accordingly, there is a need for a communication system that assures access to communication services by various groups, and which allows a group to exceed a communication resource limit when other groups supported by the communication system do not need the resources.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
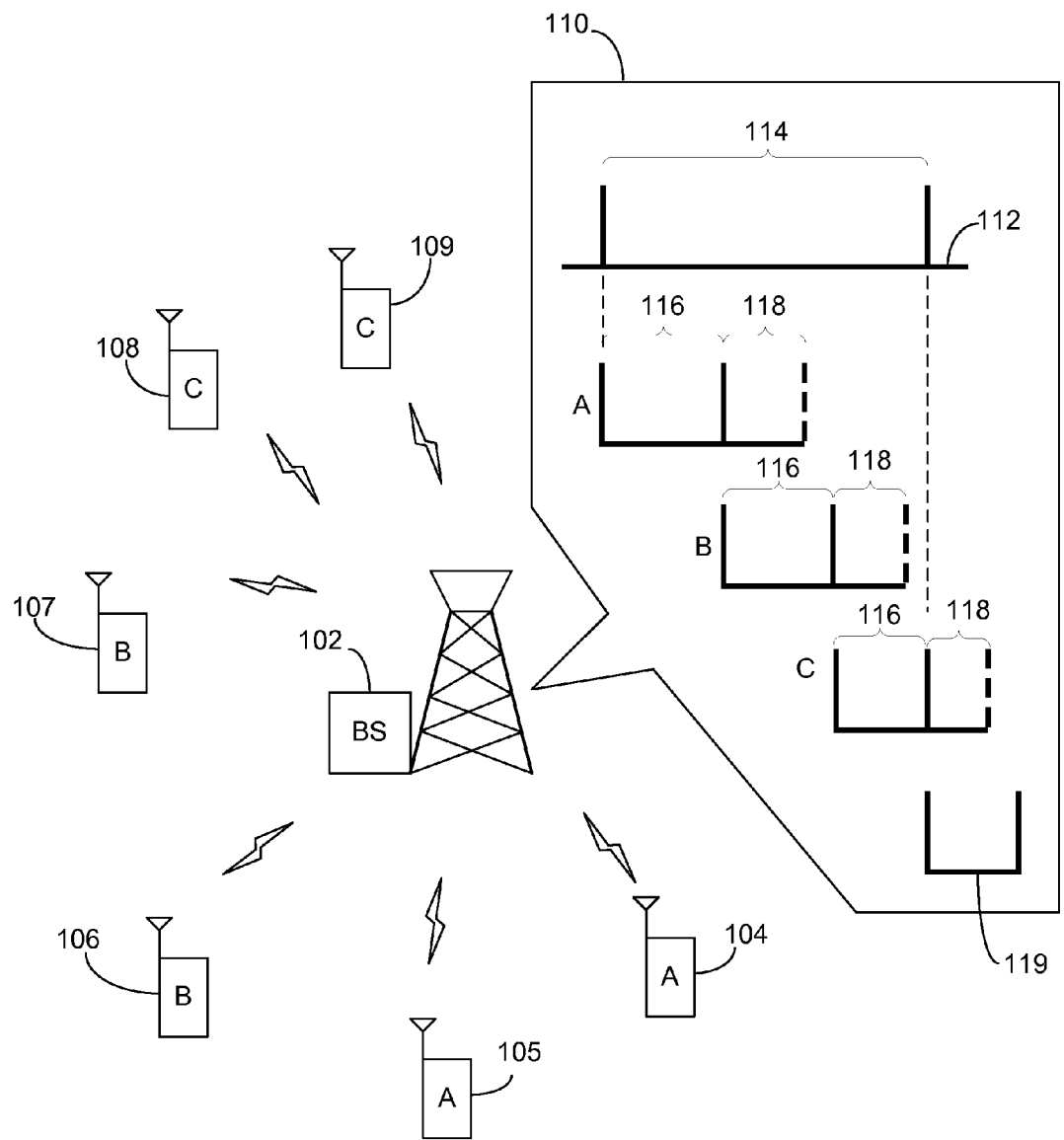
FIG. 1 is a block diagram of a portion of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The inventive arrangements taught and disclosed herein remedy the problem of guaranteeing access to communication services without limiting the access by defining for each group associated with a communication system a guaranteed bandwidth allocation and a maximum bandwidth allocation. The sum of the groups' guaranteed bandwidth allocation does not exceed the bandwidth capacity of a given base station. When a particular group is under-utilizing its guaranteed bandwidth allocation, other groups may use the under-utilized portion of the group's guaranteed bandwidth allocation, or a reserved community allocation, or both. Upon receiving a request for communication service from a user's equipment at a base station, the base station determines the requesting entity's group affiliation, and the group's present bandwidth usage of the base station's bandwidth capacity. If the group's present bandwidth usage is such that granting the request will not increase the group's bandwidth usage over the guaranteed bandwidth, the request is granted. It will be noted by those skilled in the art that the equipment used by terminal users may be referred to by various terms, including "user equipment," "mobile communication device," "communication unit," "remote unit," "mobile station," or simply "unit" in proper context, among others. All of these terms refer to a radio device that communicates with the base station for communication service from the base station.

FIG. 1 is a block diagram of a portion of a communication system 100 in accordance with at least one embodiment of the invention. The communication system includes a base station 102 which provides an air interface in the vicinity of the base station. The air interface is a radio protocol that allows units in the region served by the base station, such as communication units 104-109, to communicate with the base station. The base station, as is well known, is connected to other elements of the communication system (not shown) and facilitates communication between the communication units 104-109 and remote parties, as well as among the units. Each of the communication units is registered with the communication system and therefore allowed to access communication services, when available, at the base station. Furthermore, the communication units may belong to different groups. For example, units 104-105 belong to group A, units 106-107 to group B, and units 108-109 to group C. Each of these groups may be any of various business, private, or governmental groups. Furthermore, the there may be roaming units as well as "community" units with no group affiliation but who have authorization to access communication service. A bandwidth chart 110 illustrates one example of how the bandwidth maybe allocated to the various groups. The base station operates in a portion of the radio spectrum 112, and has a bandwidth capacity 114. Various communication protocols and standards specify different frequencies and bandwidths. The bandwidth capacity 114 may be for an outbound bandwidth for transmitting signals to the units 104-109, or it may represent an inbound bandwidth for receiving signal from the units 104-109. Below the radio spectrum chart are a series of group allocation charts labeled A-C, to correspond, respectively, with groups A-C of the units 104-109. Each group has a guaranteed bandwidth allocation 116, which means that, if necessary, the group will be able to use at least as much bandwidth as the guaranteed bandwidth. Of course the group may use less. Groups B and C each also have a guaranteed bandwidth 116. The guaranteed bandwidth allocation 116 is meant only to represent the amount of bandwidth that may be allocated, regardless of whether the actual allocation is contiguous or distributed across the base station's bandwidth. As shown in the chart 110, each group's A-C allocation chart is lined up to show how the total of each group's guaranteed bandwidth, when summed, does not exceed the bandwidth capacity 114 of the base station. This allows the base station to grant communication service requests from a member of a group when the group is using less than its guaranteed bandwidth allocation without having to first determine if there is bandwidth available. However, when a group is under-utilizing its guaranteed bandwidth allocation, other groups may use more than their guaranteed bandwidth allocation. In at least one embodiment any group may use up to the entire bandwidth capacity of the base station if no other units from outside the group requires communication service. However, when users from other groups do require service, groups that are using more than their guaranteed bandwidth allocation are then pre-empted to ensure that each group can use at least it guaranteed bandwidth allocation. Such pre-emption may be in the form of reducing the group's bandwidth, or reducing quality of service (QoS) including increasing latency, and other aspects of service, or both reducing bandwidth and QoS. The bandwidth allocation assigned to each group may be static or adjusted periodically or dynamically at the base station during operation of the base station or in accordance with a schedule or other rules. Furthermore, each group may have a different inbound and outbound bandwidth allocation which are managed independently. For example, a group that needs to exceed its guaranteed bandwidth allocation in one direction may not need to do so in the other direction.

In another embodiment groups may have a maximum bandwidth allocation that is greater than their guaranteed allocation, as indicated by additional bandwidth 118. The maximum bandwidth is the guaranteed bandwidth 116 plus the additional bandwidth 118. The additional bandwidth allocation 118 is only available if one or more groups are not fully utilizing their guaranteed bandwidth. If a group uses the additional bandwidth 118, it is subject to having communication service pre-empted if/when other groups require additional bandwidth. As shown here, each group's additional bandwidth 118 is meant to show only an additional amount of bandwidth that may be used, not a particular spectral region where the additional, or the group's guaranteed bandwidth 116 may be located. Any particular group's bandwidth usage may be distributed over the entire base station's bandwidth as units request and then release bandwidth allocation. The chart 110 is used merely to illustrate each group's proportional use of the base station's bandwidth. Groups may use multiple segments that are interspersed with other segments used by other groups.

In a simple example, there may be a single group defined at a base station with a guaranteed bandwidth allocation, with the remaining bandwidth capacity 119 of the base station being used for community or roaming users which have no group affiliation with any of the groups supported by or otherwise having a defined bandwidth allocation at the base station. When the group requires more than its guaranteed allocation, additional bandwidth may be allocated from the community allocation 119 if the community allocation is not fully utilized. In which case, if additional community users require service, the group's allocation may be pre-empted down to its guaranteed allocation to accommodate the community users. Likewise, if the community allocation is fully utilized and additional community users request service, the additional community users may be granted service if the group is under utilizing its guaranteed bandwidth allocation. Thus, the allocation proportions may see-saw back and forth around the group's guaranteed allocation as more or less users of each side require service.

It should be noted that, as shown in the chart 110, the groups A-C appear to have contiguous guaranteed bandwidth allocations. In some embodiments that can be the case, but in other embodiments the allocations may be non-contiguous. The guaranteed allocation is meant to indicate a total allocation, whether it is contiguous in the base station's spectrum or not.

Figure 2:
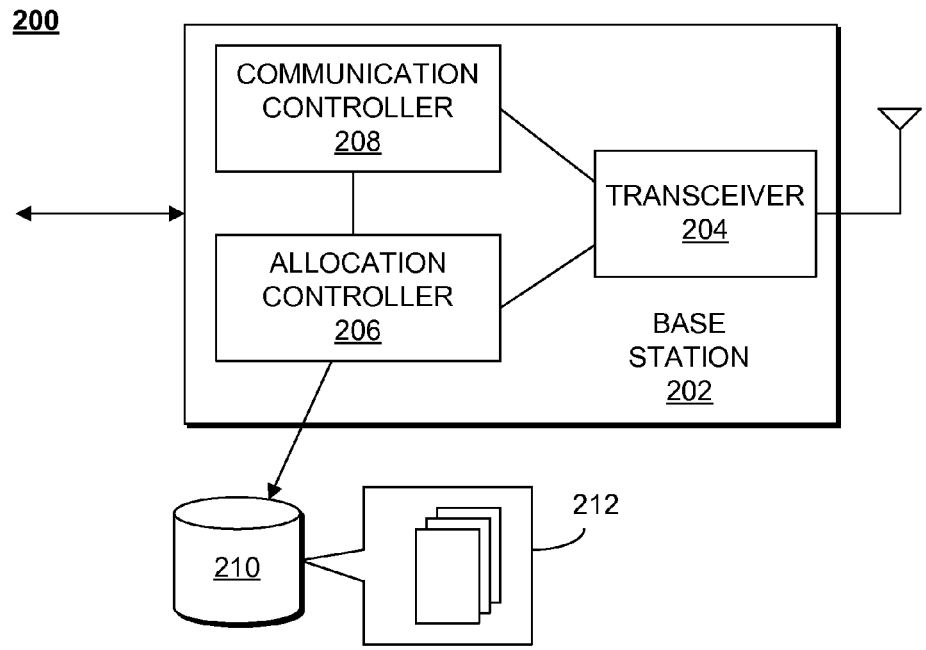
FIG. 2 is a block diagram of a base station in accordance with some embodiments.

FIG. 2 is a block diagram 200 of a base station 202 in accordance with at least one embodiment. The base station may be similar to the base station 102 of FIG. 1, and is operable to provide communication service via a radio air interface using a transceiver 204, and connect to a communication system. In practice a base station's "transceiver" is a transceiver bank having multiple transmitters and receivers which are multiplexed for various spectral regions. The transceiver 204 contains all the necessary radio hardware and controls to operate the air interface, including frequency generation and control, modulation and demodulation, filtering, amplification, and so on, as is well known. The transceiver may be comprised of several radio transmitters and receivers, and has a bandwidth capacity. Furthermore, the transceiver operates in one or more spectrum regions, and designated by the air interface protocol being used, system design, as well as governmental regulation, as applicable. In at least one embodiment the base station may be designed in accordance with the well known Long Term Evolution (LTE) standard of the 3GPP collaboration. LTE is an example of a radio access network that uses orthogonal frequency division multiplexing (OFDM). Another example of an OFDM system is that defined by the Institute of Electrical and Electronic Engineers specification 802.16, known in the industry by the name "WiMAX."

The base station 202 further comprises a bandwidth allocation controller 206 operably coupled to the transceiver 204. The allocation controller identifies all groups that will be allocated bandwidth at the base station, and the guaranteed bandwidth for each group. Each group may have a defined maximum allocation as well. The sum of each of the groups' guaranteed bandwidth is selected such that the sum does not exceed the bandwidth capacity of the transceiver. When provisioned with a maximum allocation limit, each group's maximum bandwidth will be greater than its guaranteed bandwidth. The bandwidth allocation controller may further track bandwidth usage of the bandwidth capacity of the transceiver by each of the groups. Each communication unit's group membership may be determined upon the communication unit attaching to, or otherwise associating with the base station for communication service. The allocation controller may be coupled to a storage element 210 in which various group records 212 are stored identifying each group and each group's respective allocation limits. The allocation controller may further use memory space in the storage element 210 to track bandwidth usage while the base station is operating and providing communication service.

The base station may further comprise a communication controller 208 which evaluates communication requests received at the base station from a requesting entity and determines to which group the requesting entity belongs. When granting the communication requests will result in the requesting entity's group bandwidth usage being below the group's guaranteed bandwidth, the communication controller grants the communication request. The communication controller may also allow a request if the resulting group's usage exceeds the guaranteed bandwidth if there is available bandwidth. The amount of bandwidth that may be used in excess of the guaranteed bandwidth may be limited to a maximum bandwidth, which may be a set amount of bandwidth, if available, or which may be limited by the availability of the base station's bandwidth. Furthermore, the communication controller may act to pre-empt bandwidth usage when requesting entity's group's bandwidth usage is less than its guaranteed bandwidth, and all other bandwidth is being used. Thus, each group has priority over other groups up to its respective guaranteed bandwidth. Groups may exceed their guaranteed bandwidth if other groups under utilize their guaranteed bandwidth or if there is a community bandwidth allocation.

Pre-emption, when necessary may be performed according to a pre-selected criteria, such as a priority hierarchy. For example, if a given base station supports a police group, a fire response group, and a business group and the fire group and business group both have allocations that exceed their respective guaranteed allocations, while the police group is underutilizing its guaranteed allocation, if more police allocation is requested, the business group (having a lower priority relative to the fire group) may be pre-empted over the fire response group. In some embodiments, emergency services groups may be allowed to pre-empt non-emergency or private groups even below their guaranteed allocation.

The bandwidth allocation controller and communication controller as shown here are functional blocks which may be embodied in known components of base station hardware with the addition of appropriately designed instruction code and other elements necessary to realize their functions.

Figure 3:
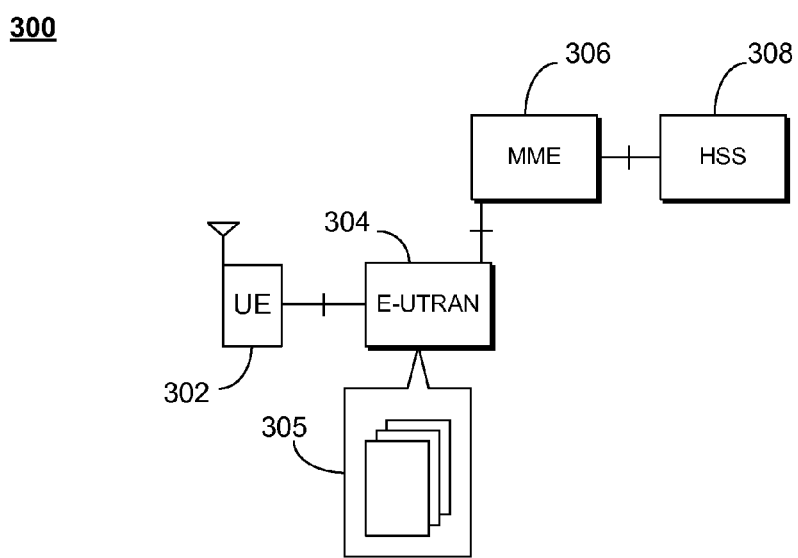
FIG. 3 is a block diagram of a communication system configured according to the Long Term Evolution standard and modified in accordance with some embodiments.

FIG. 3 is a block diagram of a communication system 300 configured according to the LTE standard and modified in accordance with some embodiments. A user equipment (UE) 302 is linked to an enhanced universal mobile telecommunication system (UMTS) terrestrial radio access network (E-UTRAN) 304. In particular, the communication unit 302 is linked via an air interface to a base station of the E-UTRAN, the base station being referred to an enhanced Node B (eNodeB) which uses OFDM radio access. The E-UTRAN, to facilitate proper bandwidth allocation contains records 305 identifying groups and their respective allocation limits. The group allocation configurations may be created at a central location and have specific allocation schedules for each eNodeB or base site, which are transmitted to the base sites for implementation. The group allocation may be changed at the base station dynamically during operation, either by an operator or based on a schedule or other rules. The E-UTRAN 304 is supported by a mobility management entity (MME) 306 and a home subscriber server (HSS) 308. The MME facilitates mobility of communication units in the system, indicating a present cell location, if known, for example, among other well known functions. The HSS operates conventionally, identifying each communication unit authorized to access the communication system, but also, according to some embodiments, indicates a group membership. Accordingly, when a UE 302 associates with a base station, in the association process the base station queries the HSS to authorize the request and receive information concerning group membership. Additional system elements known in an LTE communication system, such as gateways, are not shown here, but would be apparent to those familiar with LTE systems and specifications.

Figure 4:
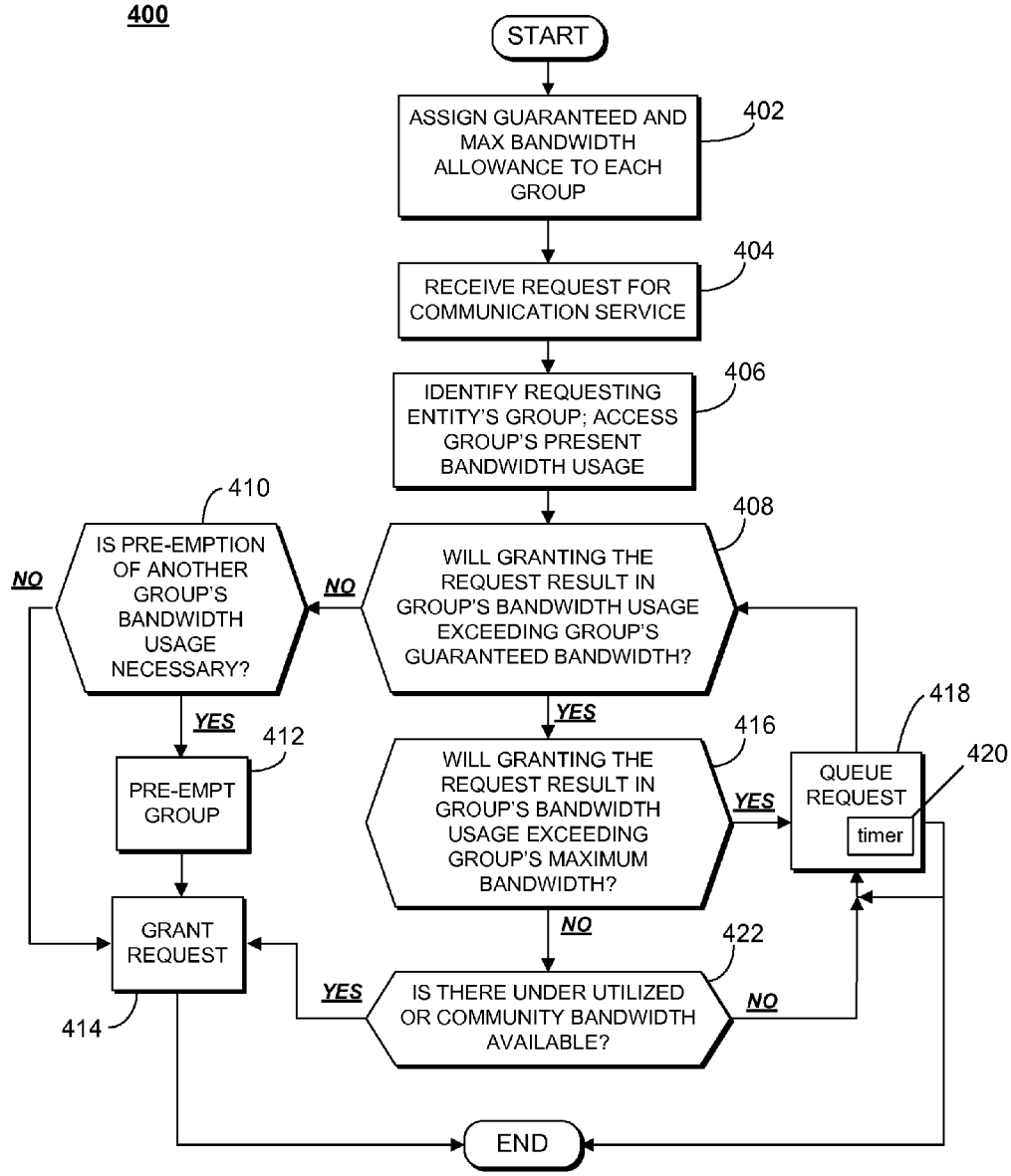
FIG. 4 is a flow chart of a method of bandwidth brokering in accordance with some embodiments.

FIG. 4 is a flow chart of a method 400 of bandwidth brokering in accordance with some embodiments. Bandwidth brokering is a process of allowing groups to utilize bandwidth otherwise allocated to other groups when needed and when the other groups are under utilizing their bandwidth allocation, while at the same time assuring at least a minimum amount of bandwidth during busy, high traffic periods. In some embodiments, the method is performed by a base station of a communication system, such as any of the base stations discussed in reference to FIGS. 1-3. A first process undertaken in the method, as indicated in box 402, is to assign a guaranteed bandwidth for each of a plurality of groups, although a single group may be handled in the same manner when there is a community or open allocation as well. Furthermore, each group's membership must be defined, for example, by provisioning a groups with UE identifiers at a HSS. In some embodiments, and maximum bandwidth may also be designated for any or all groups. The group information may be configured at a management or operations center of the communication network, but each base station in the network may have its own group bandwidth allocation information, specifying the groups and their respective bandwidth limits. Different base stations can have different bandwidth allocations for the groups such that a given group having one amount of bandwidth at a first base station may have a different amount of bandwidth at another base station.

Subsequent to the initial bandwidth information being initialized at the base station, the base station may receive a request for communication service, as indicated at box 404. The request may come from a communication unit already associated and camped at base station, or it may come from the networks, such as a handoff request, or an incoming call or data session to a communication unit associated with the base station. The method then ascertains the requesting entity's group identification, such as by querying a home subscriber server. It should be noted that it may be assumed that the mobile unit associated with the base station that is either the request originator, or the target of in incoming communication request from the communication system, is conducting legitimate group communication. However, the base station or other element of the communication system may determine that, based on either the target of the call request, or the origin of the call request, the call involves a party that is not a member of the group, in which case the communication request, if granted may be allocated in community bandwidth, rather than in the group's bandwidth allocation. Assuming, however that the call request is for group activity, the method determines if, upon granting the request, the group's bandwidth usage would exceed the group's guaranteed bandwidth, as indicated in box 408. If not, then the base station proceeds to grant the request. In some embodiments granting the request may require pre-empting another group's bandwidth usage, as indicated in boxes 410 and 412. Such a situation will occur, for example, when a group has had less bandwidth usage than its guaranteed bandwidth and another group or groups have exceeded their guaranteed bandwidth, and there is no other free bandwidth. Pre-emption may be performed according to a preselected criteria. For example, there may be a hierarchy of priority established where certain groups have a lower priority. Other criteria may include pre-empting based on a "last in, first out" scheme. Other preemption criteria will occur to those skilled in the art. The request is then granted as indicated in box 414.

If the granting the communication request would result in the group's bandwidth usage exceeding the group's guaranteed bandwidth, the method may commence from box 408 to box 416, where the base station further determines whether granting the request would cause the group's bandwidth usage to exceed a maximum bandwidth limit, assuming maximum bandwidth limits are used. The maximum bandwidth limit would be the guaranteed bandwidth plus an additional amount of bandwidth, as indicated at 116 and 118 of FIG. 1. The additional bandwidth may be configurable, or it may be a default amount of additional bandwidth. If the request will cause the group's bandwidth usage to exceed a maximum bandwidth limit, then the request may be queued (418). While queued, the request may be subject to a queue timer 420, and may be retried after a period of time, by returning to box 408. Otherwise the queue may have an expiration time and the method may simply terminate by rejecting the request.

If granting the request will not cause the group's bandwidth usage to exceed the maximum bandwidth, then the method proceeds to determine if there is under-utilized bandwidth of another group available, or if there is available community bandwidth, as indicated at box 422. If there is no available bandwidth, then the request is queued, otherwise the request is granted and the base station increments the group's bandwidth usage accordingly.

Bandwidth usage may be tracked by assigning allocation units, where each allocation unit can represent a frequency width and a time duration. For example, in LTE systems a resource block is comprised of 12 contiguous 15 KHz-wide subcarrier channels (180 KHz total width) and seven 500 microsecond long time slots on each subcarrier. Thus, a total of 84 resource elements (15 KHz wide×500 microsecond slot) in an LTE resource block. Each block may be assigned an allocation unit value of 1 (one). Thus, the base station's bandwidth capacity may be stated in terms of such allocation units (which may alternatively be referred to as "tokens" or "credits" or any other such term). Each group's guaranteed bandwidth and maximum bandwidth (if used) may likewise be expressed in terms of allocation units. A given allocation unit may accommodate several different communication activities. For example, traffic for multiple voice calls may be carried within one LTE resource block. If one resource block is allocated, but not fully utilized, additional communication requests may be accommodated in the resource block without increasing the allocation unit usage of the group.

Furthermore, each base station has both an inbound and an outbound bandwidth capacity. Certain communication activities may require heavier use of bandwidth in one direction. For example, a communication unit may request a video stream. A video stream would use up considerably more of the base station's outbound bandwidth (sending video data to the requesting unit) than in the inbound direction. On the other hand, the communication unit may request to stream a video signal from the communication unit to another party, resulting in a higher inbound bandwidth usage for the communication activity. Accordingly, in some embodiments both the inbound and outbound bandwidth (or allocation unit) usage may be examined upon receiving a request, and the decision to grant or queue the request may be made based on either the effect on inbound or outbound usage, or both.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for allocating bandwidth among groups at a base station, comprising:
    determining, at the base station, a bandwidth capacity of the communication base station;
    assigning to each of a plurality of groups a guaranteed bandwidth, wherein the sum of all groups' guaranteed bandwidth does not exceed the total bandwidth capacity of the base station;
    receiving a communication request at the base station from a user equipment of a first group of the plurality of groups;
    determining a present bandwidth usage of the base station's bandwidth capacity by the first group; and
    when the first group's present bandwidth usage is such that granting the communication request would not cause the first group's bandwidth usage to exceed the first group's guaranteed bandwidth, pre-empting a second group at the base station, wherein the second group's bandwidth usage exceeds the second group's guaranteed bandwidth, and granting the communication request, further wherein the pre-empting includes at least one of reducing the second group's bandwidth usage or reducing a quality of service of the second group provided by the base station.

2. The method of claim 1, wherein pre-empting the second group is performed by selecting the second group from among a plurality of groups, each of whose bandwidth usage at the base station exceeds each group's guaranteed bandwidth, and wherein the selecting is performed in accordance with a preselected criteria.

3. The method of claim 2, wherein the preselected criteria comprises a priority hierarchy of each of the plurality of groups, and wherein groups having a lowest priority are pre-empted before groups having a higher priority.

4. The method of claim 1, further comprising, when the first group's present bandwidth usage is such that granting the communication request would cause the first group's bandwidth usage to exceed the first group's guaranteed bandwidth, granting the communication request when the base station has available bandwidth to allocate to the communication request.

5. The method of claim 1, further comprising, wherein the first group is further assigned a maximum bandwidth which is greater than the guaranteed bandwidth, when the first group's present bandwidth usage is such that granting the communication request would cause the first group's bandwidth usage to exceed either a maximum bandwidth allocated to the group or the total bandwidth capacity of the base station, queuing the request.

6. The method of claim 1, wherein:
    determining the base station's bandwidth capacity comprises determining an inbound bandwidth capacity and an outbound bandwidth capacity;
    determining the present bandwidth usage of the base station's bandwidth capacity by the first group includes determining both an inbound bandwidth usage and an outbound bandwidth usage; and
    granting the communication request is performed when granting the communication request will maintain both the first group's inbound and outbound bandwidth usage below the guaranteed bandwidth.

7. The method of claim 6, wherein receiving the communication request comprises receiving a request to join a multicast talk group.

8. The method of claim 1, wherein determining the bandwidth capacity comprises determining the bandwidth capacity of an orthogonal frequency-division multiplexed (OFDM) air interface provided by the base station.

9. The method of claim 8, wherein the OFDM air interface conforms to a Long Term Evolution standard.

10. A base station for a wireless communication system, comprising:
    a transceiver which provides an air interface having a bandwidth capacity;
    a bandwidth allocation controller which identifies a plurality of groups and a guaranteed bandwidth for each of the plurality of groups, wherein the sum of each of the groups' guaranteed bandwidth does not exceed the bandwidth capacity of the transceiver; and each group's maximum bandwidth is greater than its guaranteed bandwidth, the bandwidth allocation controller further tracks bandwidth usage of the bandwidth capacity of the transceiver by each of the groups; and
    a communication controller that evaluates communication requests received at the base station from a requesting entity and, when the requesting entity belongs to a group, determines to which group the requesting entity belongs, when granting the communication requests will result in the requesting entity's group bandwidth usage being below the group's guaranteed bandwidth the communication controller pre-empts a bandwidth usage of a second group at the base station, wherein the second group's bandwidth usage exceeds the second group's guaranteed bandwidth and grants the communication request.

11. The base station of claim 10, wherein when the requesting entity's group's bandwidth usage is such that granting the communication request would cause the group's bandwidth usage to exceed the group's guaranteed bandwidth and not exceed the group's maximum bandwidth, the communication controller grants the communication request when the base station has available bandwidth to allocate to the communication request.

12. The base station of claim 10, wherein the bandwidth allocation controller defines the base station bandwidth capacity, each group's guaranteed and maximum bandwidths, and each group's bandwidth usage in terms of allocation units, where each allocation unit is a fractional unit of the bandwidth capacity for a period of time.

13. The base station of claim 10, wherein:
the transceiver bandwidth capacity includes an inbound bandwidth capacity and an outbound bandwidth capacity; and
the communication controller grants the communication request when granting the communication request will maintain both the group's inbound and outbound bandwidth usage below the guaranteed bandwidth.

14. A method for bandwidth brokering at a base station of a communication system, comprising:
receiving a request for communication service at the base station from a requesting entity;
determining a group affiliation of the requesting entity from among a plurality of groups, each of the plurality of groups having a guaranteed bandwidth of a bandwidth capacity of the base station, and each of the groups further having a maximum bandwidth wherein the maximum bandwidth for each group is greater than each group's guaranteed bandwidth, and the sum of the groups' guaranteed bandwidth does not exceed the bandwidth capacity of the base station; and
granting the request for communication service when either:
a bandwidth usage of the requesting entity's group of the base station's bandwidth capacity will be less than the group's guaranteed bandwidth upon granting the request, wherein granting the request for communication service further comprises pre-empting bandwidth usage by second group whose bandwidth usage of the base station's bandwidth capacity is more than the second group's guaranteed bandwidth; or
the bandwidth usage of the requesting entity's group of the base station's bandwidth capacity will be less than the group's maximum bandwidth and more than the group's guaranteed bandwidth upon granting the request, and the base station has free bandwidth.

15. The method of claim 14, wherein pre-empting bandwidth usage by the second group is performed by selecting the second group from among a plurality of groups, each of whose bandwidth usage at the base station exceeds each group's guaranteed bandwidth, and wherein the selecting is performed in accordance with a preselected criteria.

16. The method of claim 15, wherein the preselected criteria comprises a priority hierarchy of each of the plurality of groups, and wherein groups having a lowest priority are pre-empted before groups having a higher priority.

17. The method of claim 14, wherein the bandwidth usage of the requesting entity's group is non-contiguous.

\* \* \* \* \*